Nov. 1, 1949.　　　R. F. RYDER　　　2,486,437
PARACHUTE FOLDING TABLE
Filed April 3, 1945
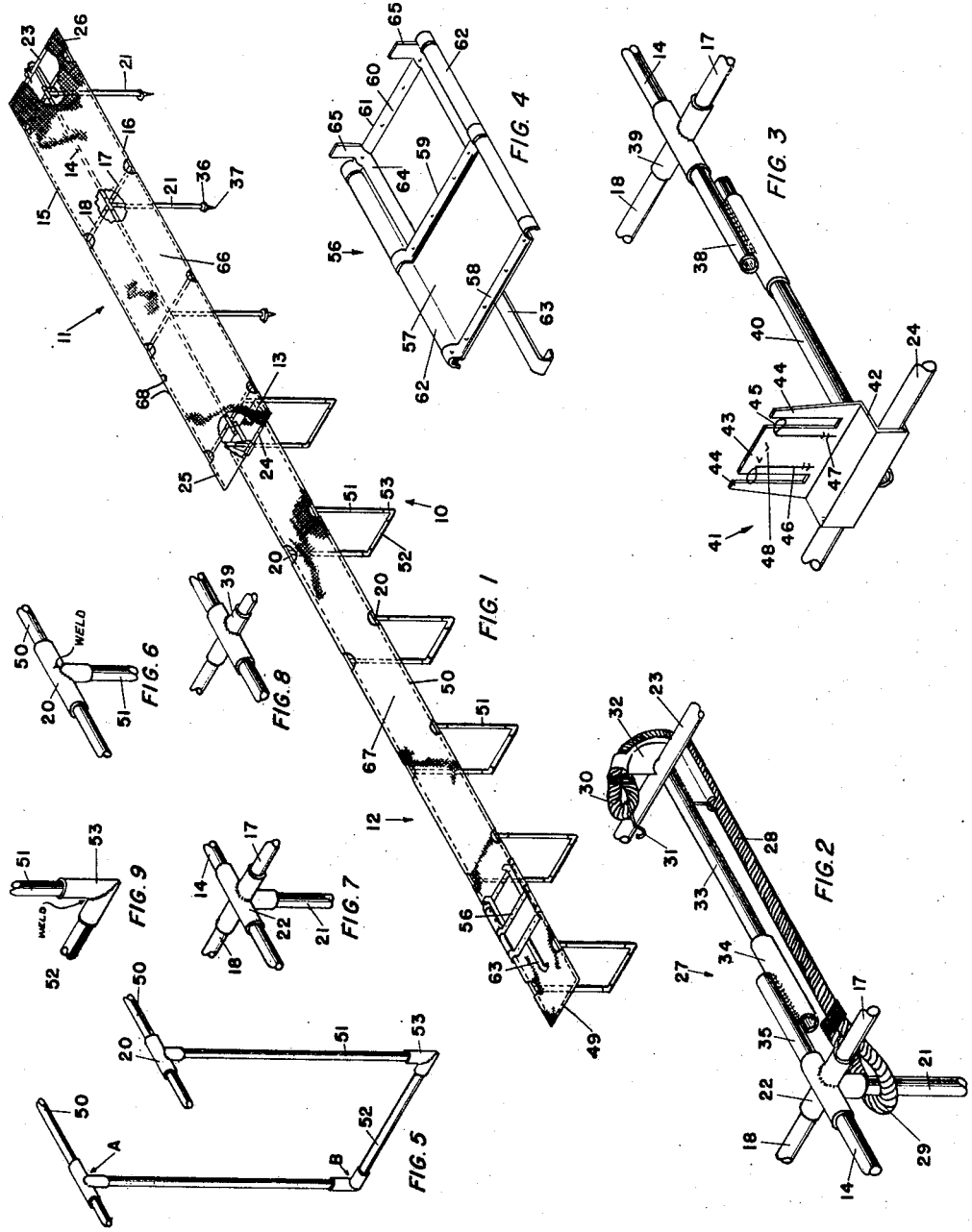
Inventor
ROGER F. RYDER.
By Ralph L Chappell
Attorney Patented Nov. 1, 1949

2,486,437

UNITED STATES PATENT OFFICE 2,486,437

PARACHUTE FOLDING TABLE

Roger F. Ryder, United States Marine Corps

Application April 3, 1945, Serial No. 586,432

6 Claims. (Cl. 311—89)

(Granted under the act of March 3, 1883, as amended April 30, 1928; 370 O. G. 757)

This invention relates to a parachute table and has for an object to provide a knockdown table especially intended for servicing parachutes in the field when packing or repacking the parachutes, although equally serviceable in permanent stations and on shipboard, particularly aircraft carriers where it can be set up temporarily whenever needed.

A further object of this invention is to provide a parachute table which can be knocked down, transported and reassembled without the use of any tools or equipment, and when knocked down, is small enough to be easily transported by air.

Still another object of this invention is to provide a portable knockdown parachute folding table wherein all the accessory units such as parachute canopy tension units and shroud line holders are built into the frame of the table.

Another object of this invention is to provide a parachute folding table consisting of a knockdown framework and canvas table surface, which table surface will not affect the temperature of the parachute as it is being folded, thus preventing a tendency to condense moisture from the air thereon during the folding process.

Still a further object of this invention is to provide a knockdown parachute folding table which includes a sliding packing tray slidable over the fabric table surface for receiving and holding the parachute pack during the process of packing the shroud lines and parachute therein.

With the foregoing and other objects in view, the invention consists in the construction, combination and arrangement of parts hereinafter set forth, claimed and illustrated in the drawings in which:

Fig. 1 is an isometric view of the assembled parachute folding table.

Fig. 2 is an isometric detail view of the shroud line tension unit.

Fig. 3 is a fragmentary isometric detail view of the shroud line holder.

Fig. 4 is an isometric detail view of the packing tray.

Fig. 5 is an isometric detail view of one of the legs at the packing end of the table, and Figs. 6 to 9, inclusive, are detail fragmentary isometric views of different fittings forming part of the table.

There is shown at 10 the parachute maintenance field table of this invention which includes a parachute folding section 11, and a parachute packing section 12, the parachute folding section 11 being approximately five inches higher than the parachute packing section 12. While the preferred dimensions are being here given, it will be understood that the table is not to be restricted to such dimensions, particularly in view of the fact that there are different sized parachutes and it may be necessary to vary the dimensions to accommodate different sized parachutes.

The parachute folding section 11 of the table 10 is approximately fourteen feet long by about thirty-five inches wide, while the parachute packing section 12 is about twenty-one feet long by eighteen inches wide. The folding section 11 is about thirty-seven inches high and the adjoining end 13 of the folding section 11 overlaps the packing table end 12 for about ten inches, the packing section 12 being about thirty-two inches high. The entire framework of the table is made up of bars or tubing which is joined together by the fittings shown in detail in Figs. 6 to 9, inclusive. The framework of the parachute folding section 11 of the table 10 has a central bar 14 supported between two side bars 15 and 16 and has a plurality of connecting crossbars 17 and 18. The side bars 15 and 16 are connected to the crossbars 17 and 18 by slidable connection of the bars with T fittings 20, shown in Fig. 6, while the crossbars 17 and 18 and the central bar 14 are connected to each other and to a vertical central leg 21 by slidable connection with the crossed T fittings 22, shown in Fig. 7. End cross bars 23 and 24 are joined by short side bars 25 and 26 to the parachute folding section 11. Extending around the end bar 23 is a parachute canopy tension device 27, shown in detail in Fig. 2. This parachute canopy tension device 27 includes a bungee or elastic cord 28 having a loop 29 anchored about the last leg 21 and having a second loop 30 provided with a hook 31 and extending about a guiding J bar 32 welded to a short bar 33 adapted to slide into one tube of an offset fitting 34 whose other tube 35 extends into the cross T fitting 22.

The tubing 21 at its bottom end terminates in a flanged footing 36 into which can be inserted a footing pin 37 when the table is placed on the ground, the pin 37 being obviously omitted when the table is placed on a floor or deck.

A second offset fitting 38, extending into the cross fitting 39 of Fig. 8, serves to receive a short tube 40 which is welded to the bottom of the shroud line holder 41, shown in detail in Fig. 3. This shroud line holder 41 includes an angle plate 42 adapted to extend about the end crossbar 24. An upstanding plate 43 secured on the angle plate 42 is provided with two shroud line receiving slots 44. Pivoted to the plate 43 alongside each of the slots 44 is a slot-closing latch 45 having a pivoting stem 46 extending through a pair of eyes 47 welded to the plate 43. Also secured to the plate 43 are a pair of latch hooks 48 for holding the latches 45 in slot-opening position when so desired. As will be apparent, the latches 45 with their stems 46 may each be formed from a piece of stiff wire shaped somewhat like a numeral "9" with a straight stem.

The packing section 12 includes a plurality of side bars 50 joined to each other and to U legs 51 of Fig. 5 by means of T fittings 20 of Fig. 6. The U legs 51 including bight members 52 are joined together by means of angle fittings 53, as shown in Fig. 9.

There is also provided the sliding packing tray 56 shaped substantially as shown in Fig. 2. This tray is preferably of a sheet 57 of aluminum shaped as shown with three brass cross straps 58, 59, and 60, the end cross strap 60 being bent at about a 45-degree angle, as at 61, from the plane of the tray. The longitudinal edges 62 of the tray are bent into semicircles to fit over the tops of the table side bars 50. Extending from the cross straps 58 at the other end is a J hook 63 of spring steel adapted to be hooked over the end table bar 49 when so needed, and to be released therefrom for permitting the tray 56 to slide along the table. Welded to the center bar 59 and the end bar 60 are a pair of spring steel straps 64 ending in upstanding toes 65.

The table surface, as shown in Fig 1, consists of two canvas sections, 66 and 67, of appropriate length and width to fit each over its own parachute folding section 11 and parachute packing section 12. As shown, the canvas table surfaces 66 and 67 are attached in position by having loops 68 of appropriate length to fit each of the individual side and end bars somewhat in the same manner as in the conventional Army cot, the side and end bars of the table sections being extended through the table surface loops 68 before they are placed in their appropriate fittings. With the table thus assembled, the parachute canopy is stretched over the parachute folding table 11 and the parachute cover is placed on the sliding packing tray 56, which has its hook 63 extended over the end bar 49. The shroud lines are divided into two groups as customary and then placed in the slots 44 of the shroud line holder 41, being held therein by the latches 45. The end of the canopy is held by the hook 31 of the canopy tension device 27.

As thus mounted, the parachute is packed in the manner obvious to the trained parachute rigger. The parachute panels are brought into appropriate position on the surface of the folding section 11, resting on the canvas table surface. An incidental, but very desirable, advantage of this canvas table surface, which will be of aircraft "grey duck," is that the parachute panels rest on the lint which holds it off the fabric, allowing air circulation. The temperature of duck changes very little in normal atmosphere. Therefore, the parachute panels will not become damp with contact therewith as they are apt to when in contact with the hard table surface of wooden or metal packing tables. Parachutes packed on this table surface will retain their positive opening qualities for longer periods after packing than those on hard and cold table surfaces.

After the panels have been appropriately laid over each other, the hook 63 is released from the end bar 49 and the shroud lines are packed in their elastic holders on the parachute cover in the customary manner, the tray 56 being slid upwardly toward the center joining section 13. When the shroud lines are fully packed, the sliding tray 56 will have completely reached the center joining section 13. The latches 45 are operated to release the shroud lines therefrom and the shroud line holder 41 may be detached by merely sliding its bar 40 out from the offset fitting 38. Due to the five inch differential between the surface of the table sections 11 and 12, the parachute cover with its packed shroud lines will be slightly below the surface of the table section 11. The end of the canopy is then released from hook 31 and the canopy is folded over the packed shroud lines by means of the usual H or U type folding bar, thus enabling the folding of the canopy to be completed and permitting the parachute to be fastened and secured in the usual manner.

Other modifications and changes in the number and arrangement of the parts may be made by those skilled in the art without departing from the nature of this invention, within the scope of what is hereinafter claimed.

The invention herein described and claimed may be manufactured and used by or for the Government of the United States of America for governmental purposes without the payment of any royalties thereon or therefor.

What is claimed is:

1. A parachute packing table comprising a parachute folding section and a shroud line and parachute packing section, said parachute folding section being wider than, higher than, and shorter than said parachute shroud line and packing section, said higher parachute folding section having one end joined to and overlapping one end of said parachute shroud line and packing section in vertically spaced relation, and a shroud line holder having a portion disposed beneath and detachably secured to said overlapping end of said parachute folding section.

2. A parachute packing table comprising a parachute folding section and a shroud line and parachute packing section, said parachute folding section being wider than, higher than, and shorter than said parachute shroud line and packing section, said parachute folding section having one end joined to and overlapping one end of said parachute shroud line and packing section, a shroud line holder detachably secured to said overlapping end of said parachute folding section, and a canopy tension device mounted at the other end of said parachute folding section, said canopy tension device comprising an elastic cord one end thereof being mounted beneath said end of said parachute folding section, the other end of said elastic cord having a hook thereon and extending over the said end of said section to the upper side thereof, and means detachably secured to said end of said section and guiding said other end of said cord.

3. A parachute packing table comprising a parachute folding section and a shroud line and parachute packing section, said parachute folding section being wider than, higher than, and shorter than said parachute shroud line and packing section, said parachute folding section having one end joined to and overlapping one end of said parachute shroud line and packing section, a shroud line holder detachably secured to said overlapping end of said parachute folding section, a canopy tension device mounted at the other end of said parachute folding section, and a parachute packing tray having means at its longitudinal edges in slidable engagement on said parachute shroud line and packing section, said packing tray including a spring hook extending therefrom adapted to cooperate with an end bar of said parachute shroud line and packing section.

4. A knockdown parachute packing table comprising a parachute folding section and a shroud line and parachute packing section, said parachute folding section being wider than, higher than, and shorter than said parachute shroud line and packing section, each of said sections including a plurality of fittings and a plurality of bars in slidable connection with said fittings, the bars and fittings of said parachute folding section being formed into a longitudinal center bar and parallel edge bars and a plurality of single leg bars supporting said longitudinal center bar, the bars and fittings of said parachute packing section being formed into a pair of parallel side bars and a plurality of U legs supporting said parallel side bars.

5. A knockdown parachute packing table comprising a parachute folding section and a shroud line and parachute packing section, said parachute folding section being wider than, higher than, and shorter than said parachute shroud line and packing section, each of said sections including a plurality of fittings and a plurality of bars in slidable connection with said fittings, the bars and fittings of said parachute folding section being formed into a longitudinal center bar and parallel edge bars and a plurality of single leg bars supporting said longitudinal center bar, the bars and fittings of said parachute packing section being formed into a pair of parallel side bars and a plurality of U legs supporting said parallel side bars, one end of said parachute folding section being joined to but overlapping one end of said parachute packing section.

6. A parachute packing table comprising a parachute folding section and a shroud line and parachute packing section, said parachute folding section being wider than, higher than, and shorter than said parachute shroud line and packing section, said higher parachute folding section having one end joined to and overlapping one end of said parachute shroud line and packing section in vertically spaced relation, and a shroud line holder having a portion disposed beneath and detachably secured to said overlapping end of said parachute folding section, said shroud line holder including an upstanding plate member disposed above said overlapping end of said parachute folding section and having vertically disposed slots for receiving the shroud lines.

ROGER F. RYDER.

REFERENCES CITED

The following references are of record in the file of this patent:

UNITED STATES PATENTS

| Number | Name | Date |
|---|---|---|
| 229,497 | Trilk | June 29, 1880 |
| 967,600 | Bernstein | Aug. 16, 1910 |
| 2,099,450 | Meyer | Nov. 16, 1937 |
| 2,175,968 | Noelcke | Oct. 10, 1939 |
| 2,276,308 | Hugh | Mar. 17, 1942 |

FOREIGN PATENTS

| Number | Country | Date |
|---|---|---|
| 171,291 | Switzerland | Aug. 31, 1934 |

OTHER REFERENCES

Picture, top of page facing page 44, "Irvin Air Chute," published by Irvin Air Chute Co., Inc., 1670 Jefferson Ave., Buffalo, N. Y., U. S. A.